L. Gebhart.
Cider-Mill.
No. 73523. Patented Jan. 21, 1868
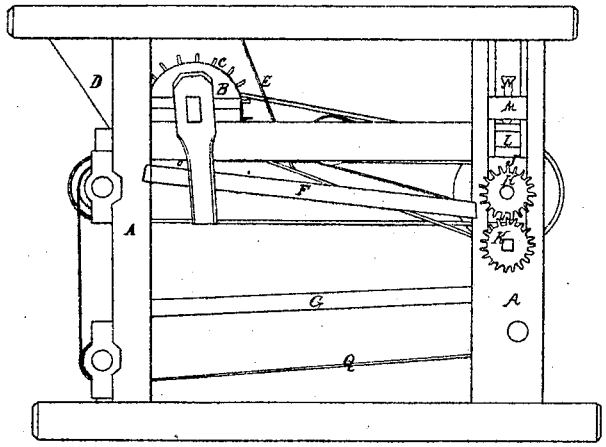
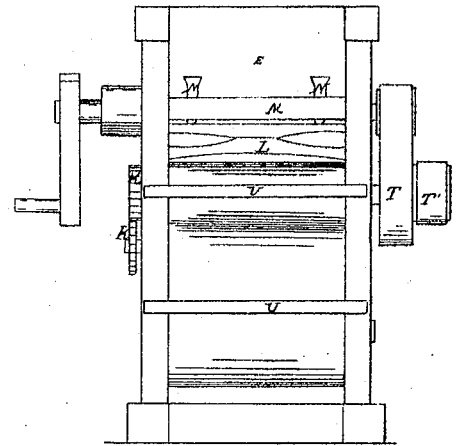
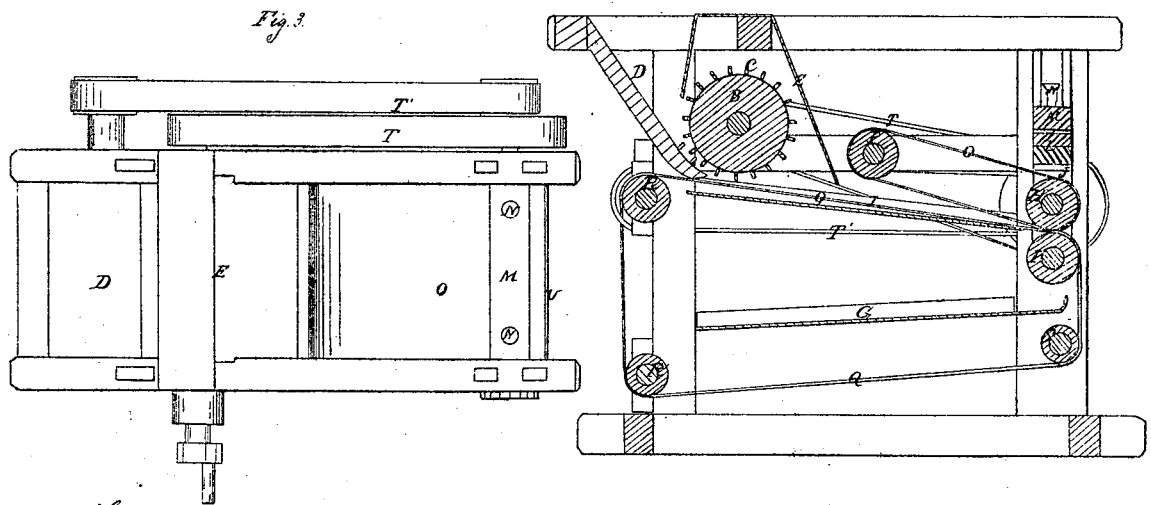
Witnesses
J. H. Burridge
Frank S. Alden
Inventor
L. Gebhart

United States Patent Office.

LEWIS GEBHART, OF ORANGEVILLE, OHIO.

Letters Patent No. 73,523, dated January 21, 1868.

IMPROVED CIDER-MILL.

*The Schedule referred to in these Letters Patent and making part of the same.*

TO ALL WHOM IT MAY CONCERN:

Be it known that I, LEWIS GEBHART, of Orangeville, in the county of Trumbull, and State of Ohio, have invented certain new and useful Improvements in Cider-Mills, &c.; and I do hereby declare that the following is a full and complete description of the same, reference being had to the accompanying drawings, making a part of this specification, in which—

Figure 1 is a side view of the mill.
Figure 2 is an end view.
Figure 3, a view of the top.
Figure 4 is a vertical longitudinal section.
Like letters of reference refer to like parts in the views.

In fig. 1, A is the frame of the machine, which is constructed of wood, and of any size, according to the capacity required. In this frame is journalled a roller, B, studded with nails, C, and which is made to revolve close to the bottom and side of a hopper, D, fig. 3, into which the fruit is thrown for grinding. This roller or grater is covered with an apron, E, for the purpose of keeping the fruit, while being ground, from scattering, and which constitutes the mill of the machine. Immediately below the roller is arranged a strainer, F, fig. 1, which consists of a shallow pan, of the same length and width as the frame, and which is perforated with small holes, thus allowing the juice to run through, but keeping back the coarse pomace. Below this strainer is a receiver, G, which is a tight pan, of the same size and shape as the strainer.

The press connected to this mill consists of a pair of rollers, H I, fig. 4, journalled in the post of the frame in movable seats or blocks, J, fitted in the slots of the posts, and are geared to each other by the cog-wheels K, fig. 1. These rollers are kept hard pressed to each other by a spring, L, fig. 2, the ends of which are made to rest upon the blocks of the upper roller, and resisted by a cross-piece, M, through which the adjusting-screws N are projected, and the degree of pressure thereby gauged. O, fig. 4, is an endless apron, passing around the roller P and the press-roller H, the purpose of which will hereafter be shown. Q is also an endless apron, passing around the rollers R R' and S, thence over the press-rollers I to the roller R.

This machine can be driven either by hand or by power, and the practical operation of the same is as follows:

The apples are thrown into the hopper D, from which they run through the grater, and the pomace falls upon the apron Q, (which is driven, as well as the apron O, by belts T T', fig. 3,) and is carried by it and the apron O between the press-rollers H I, and the juice thereby expressed, which is strained by the cloth apron, and flows into the pan G, from thence into barrels or a receiver, as the case may be, while the dry pomace passes to the front of the rollers, and is scraped off by the scrapers U. The pomace thus removed falls to the foot of the machine, and the apron returns to the mill clean to be again charged with pomace, and conduct it to the press, as before. Thus the fruit is ground into pomace and carried to the press and the juice expressed, in one continuous operation.

By this process it will be obvious that no extra labor and appliances are required to make the wet pomace into a cheese by piling it up with straw within a crate for the purpose of subjecting it to the action of a press, which, as usually done, is a matter of much time and labor, and attended by a large expense for the necessary and proper appliances for the purpose. This mill is equally adapted for grinding small fruits, as currants, grapes, &c., and is much less expensive and more convenient, as it can be constructed of a small size to be worked by hand, and thus become adapted to family use, or it can be constructed of a large size, and run by some power.

What I claim as my improvement, and desire to secure by Letters Patent, is—

The cider-mill, consisting of the toothed cylinder B, strainer F, endless aprons O Q, pan G, spring L, adjustable roller H, and roller I, all constructed and arranged to operate in the manner as and for the purpose set forth.

LEWIS GEBHART.

Witnesses:
J. H. BURRIDGE,
J. HOLMES.